3,284,287
INHIBITING GROWTH OF FUNGI
AND BACTERIA
John J. D'Amico, Charleston, W. Va., assignor to Monsanto Company, St. Louis, Mo., a corporation of Delaware
No Drawing. Filed Jan. 29, 1964, Ser. No. 341,127
7 Claims. (Cl. 167—22)

This invention relates to methods to methods and compositions for the control of fungi and bacteria. More particularly, the present invention relates to methods and compositions employing cyanoethyldithiocarbamates for the control of the common plant fungal pathogen *Venturia inaequalis*, the causative organism of apple scab. The invention is especially concerned with protecting foilage with esters of cyanoethyldithiocarbamic acid.

Apple scab is one of the major economic problems in the growing of fruit. Growing a marketable crop requires a dust or spray schedule that includes regular application of toxicant for *Venturia inaequalis*. Application of the new toxicants to the habitat of the fungus prevents is growth and spread. The new toxicants are economical to produce and cause no injury to the foliage or fruit at effective concentrations.

The active agents employed in the process of this invention may be represented by the formula

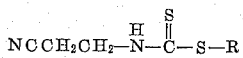

where R is lower 2-alkenyl, halogen substituted lower 2-alkenyl, or cyano-substituted lower alkyl. In general R will contain 2 to 4 carbon atoms. Examples of R comprise allyl, methallyl, cyanoethyl 2-cyanopropyl, 2-chloroallyl, 2-bromoallyl, 3-chloroallyl, 3-iodoallyl, 2-fluoro-3-chloroallyl, 3-bromo-2-butenyl, 3-chloro-2-butenyl, 2,3-dichloroallyl, 3,3-dichloroallyl, 2,3-dichloro-2-butenyl, 2,3-diiodo-2-butenyl, 2,3-dibromoallyl, 2,3-dichloro-4-bromobutenyl, and 2,3,3-trichloroallyl.

The fungicidal compositions of the present invention may be prepared by combining one of the 2-cyanoethyldithiocarbamates of the class described with a liquid or solid carrier. The active ingredients are insoluble in water but are soluble in some organic solvents, such as acetone, ethanol, and benzene. They may be dispersed in water with the aid of a dispersing agent to form a concentrate which is subsequently diluted with water to form a spray suitable for application to living plants subject to fungus attack. Alternatively, the products may be admixed with an inert solid diluent such as talc, diatomaceous earth, fuller's earth, etc., to form dry compositions which can be employed as such in the form of dusts or which can be dispersed in an aqueous medium to form a liquid spray. In general, any of the conventional formulation and application techniques may be followed in employing the toxicants, and any known herbicide adjuvants which include wetting agents and dispersing agents and inert carriers may be employed in combination with them. Where desired the compounds may be used in combination with other biological toxicants.

As a specific embodiment of the invention, fungicidal activity was demonstrated by spore germination tests on glass slides. In this procedure the experimental compound was formulated as a 10 p.p.m. aqueous solution. One drop of this solution was placed in a well of a concavity glass slide and two drops of a conidial suspension of *Venturia inaequalis* (adjusted to 625,000 per ml.) were added. The slides were then placed into a petri plate, water added to the plate to provide humidity, and the plate covered with a lid. After 24 hours the cover was removed, the slides examined and the observations recorded.

For convenience in recording the data the following rating key was employed:

1—no germination, complete control
2—short germ tubes, definite chemical activity
*5—no inhibition of germination

* At least four untreated slides were set up for each test in order to compare the appearance of the chemically treated organism with that of the untreated system.

Results of the observations are recorded in Table I.

TABLE I

| Active Component: | Rating |
|---|---|
| 2-chloroallyl 2-cyanoethyldithiocarbamate | 1 |
| 2-chloroallyl ethyldithiocarbamate | 5 |
| 3-chloro-2-butenyl 2-cyanoethyldithiocarbamate | 2 |
| cis- and trans-2,3-dichloroallyl 2-cyanoethyldithiocarbamate | 1 |
| 2-bromoallyl 2-cyanoethyldithiocarbamate | 1 |
| 2,3,3-trichloroallyl 2-cyanoethyldithiocarbamate | 1 |
| 2-methallyl 2-cyanoethyldithiocarbamate | 2 |
| Allyl 2-cyanoethyldithiocarbamate | 2 |
| Allyl ethyldithiocarbamate | 5 |
| 3-chloroallyl 2-cyanoethyldithiocarbamate | 1 |
| 3,3-dichloroallyl 2-cyanoethyldithiocarbamate | 1 |
| 2-cyanoethyl 2-cyanoethyldithiocarbamate | 1 |
| Ethyl 2-cyanoethyldithiocarbamate | 5 |

The above data show a high order of activity by the toxicants of this invention. At 6 p.p.m. concentration 2-chloroallyl 2-cyanoethyldithiocarbamate, cis- and trans-2,3-dichloroallyl 2-cyanoethyldithiocarbamate, 2,3,3-trichloroallyl 2-cyanoethyldithiocarbamate, and 3-chloroallyl 2-cyanoethyldithiocarbamate still prevented germination. The data further show that both the cyano radical in the acid moiety and functional substituent or double bond in the ester portion are required for the properties desired.

As a further specific embodiment of the invention the new fungicides were applied to foliage of apple seedlings. Plants were selected for uniformity, sprayed with the experimental toxicants and then placed on carts to dry. Twenty-four hours later a spore suspension of *Venturia inaequalis* conida was made and adjusted to a concentration of approximately 2,500,000 spores per ml. of water. This spore suspension was sprayed uniformly over the foliage of the treated and untreated trees. Immediately thereafter the plants were placed into the incubation chamber (100% relative humidity). Seventy-two hours later the trees were removed and after a drying period were placed on greenhouse benches. Two weeks later apple scab tests were evaluated. This was done by counting the number of parisitized leaves on each plant (3 replicates per treatment), determining the average number of parisitized leaves per tree for a given treatment, and expressing the result as percent control. The percent control for each treatment was found by dividing the average number of parisitized leaves per tree in the untreated checks into the average number of parisitized leaves per tree in each treatment, multiplying this number by 100 and subtracting it from 100. The following system of transposing percent control into "Disease Rating" was used:

| Percent control: | Rating |
|---|---|
| 95–100 | 1 |
| 85–94 | 2 |
| 70–84 | 3 |
| 50–69 | 4 |
| 0–49 | 5 |

Comparisons were made with the commercially accepted fungicides N-trichloromethylthio tetrahydrophthalimide (Captan) and dodecylguanidine acetate (Cyprex). The percent control based on untreated trees (average of three) at a concentration of 600 p.p.m. was as shown in Table II.

TABLE II

| Active component: | Percent control |
|---|---|
| 2-chloroallyl 2-cyanoethyldithiocarbamate | 100 |
| 2,3,3-trichloroallyl 2-cyanoethyldithiocarbamate | 100 |
| 2-methallyl 2-cyanoethyldithiocarbamate | 100 |
| Captan | 76.9 |
| Cyprex | 84.6 |

Again these data show the products of the present invention are highly effective apple-scab control agents. All three toxicants out-performed both Captan and Cyprex. Furthermore, at a concentration of 300 p.p.m. 100% control was obtained with 2-chloroallyl 2-cyanoethyldithiocarbamate. At this lower concentration 43.8% control was obtained with Captan and 69.3% control was obtained with Cyprex. Comparative tests demonstrated that 3-chloroallyl 2-cyanoethyldithiocarbamate was even more active than the 2-chloroallyl ester at reduced rates. In general, aqueous sprays containing one pound of active ingredient per 100 gallons provide an ample safety margin to prevent growth of Venturia under the range of conditions normally encountered in the field and exert some eradicant action. The concentration may be reduced if desired. The toxicants of this invention also control Erwinia, a bacteria which causes fire blight.

In experiments which demonstrated useful control of other bacteria and fungi, a 1.0% stock solution of the test material was prepared in a non-toxic solvent and diluted in agar to provide ten samples containing various concentrations of the test material. Petri dishes were respectively filled with the test mixture and the plates thus prepared inoculated with the test organism. After a suitable incubation period, inspection of the plates showed complete inhibition of the growth of the organism at the indicated concentration, while identical agar test plates, except that no test material was present, showed normal uninhibited growth.

TABLE III

| Test Material | At Indicated Concentration Complete Inhibitor of— | | |
|---|---|---|---|
| | S. Aureus | S. Typhosa | A. Niger |
| Allyl 2-cyanoethyldithiocarbamate | 1/10T[1] | 1/100T | 1/10T |
| 2-chloroallyl 2-cyanoethyldithiocarbamate | 1/10T | 1/100T | 1/10T |
| 3-chloroallyl 2-cyanoethyldithiocarbamate | 1/10T | 1/100T | 1/10T |
| 3,3-dichloroallyl 2-cyanoethyldithiocarbamate | 1/10T | 1/10T | 1/100T |
| 2-bromoallyl-2-cyanoethyldithiocarbamate | 1/100T | 1/M[2] | 1/M |
| 3-chloro-2-butenyl 2-cyanoethyldithiocarbamate | 1/10T | 1/100T | 1/100T |
| cis and trans-2,3-dichloroallyl-2-cyanoethyldithiocarbamate | 1/M | 1/M | 1/M |

[1] T=1,000.
[2] M=1,000,000.

The active agents embraced in the process of this invention are new compounds which may be prepared as illustrated by the following examples:

*Example 1*

Approximately 14 grams (0.2 mole) of 2-cyanoethylamine was dissolved in 120 ml. of water and 12.6 grams (0.2 mole) of concentrated ammonium hydroxide. This solution was stirred at 5–15° C. while to it was added dropwise 15.2 grams (0.2 mole) of carbon disulfide. The reaction mixture was stirred at 25–30° C. for 1 hour. There was then added 22.2 grams (0.2 mole) of 2-chloroallyl chloride. The reaction mixture was stirred at 25–30° C. for 24 hours and then 200 ml. of water was added. After cooling to 0° C. the precipitate which formed was collected by filtration, washed with cold water until neutral and air-dried at 25–30° C. 2-chloroallyl 2-cyanoethyldithiocarbamate, a yellow solid was obtained in 99% yield.

After recrystallization from ethyl alcohol it melted at 63–65° C. Analysis gave 12.63% nitrogen and 28.89% sulfur compared to 12.69% nitrogen and 29.05% sulfur calculated for $C_7H_9ClN_2S_2$.

Employing substantially the same reaction conditions and replacing the 2-chloroallyl chloride with an equimolar amount, respectively, of 3-chloro-2-butenyl chloride and cis- and trans-2,3-dichloroallyl chloride, further examples were prepared possessing the following physical properties:

*Example 2*

3-chloro-2-butenyl 2-cyanoethyldithiocarbamate, a tan solid, in 99% yield. After recrystallization from dilute alcohol it melted at 49–50° C. Analysis gave 11.27% nitrogen and 26.62% sulfur compared to 11.93% nitrogen and 27.32% sulfur calculated for $C_8H_{11}ClN_2S_2$.

*Example 3*

Cis- and trans-2,3-dichloroallyl 2-cyanoethyldithiocarbamate, a tan solid, in 45.2% yield. After recrystallization from dilute alcohol it melted at 72–74° C. Analysis gave 10.76% nitrogen, 24.96% sulfur, and 27.44% chlorine compared to 10.98% nitrogen, 25.13% sulfur, and 27.79% chlorine calculated for $C_7H_8Cl_2N_2S_2$.

*Example 4*

For 2-chloroallyl chloride in Example 1 there was substituted 31.1 grams (0.2 mole) of 2-bromoallyl chloride and the charge was stirred at 25–30° C. for 24 hours. The reaction mixture was then extracted with 500 ml. of ethyl ether, the ether extract washed with water until neutral to litmus and dried over sodium sulfate. The ether was removed in vacuo at a maximum temperature of 80–90° C./1–2 mm. 2-bromoallyl 2-cyanoethyldithiocarbamate was obtained in 89.2% yield as a dark amber oil analyzing 9.71% nitrogen and 23.88% sulfur compared to 10.56% nitrogen and 24.18% sulfur calculated for $C_7H_9BrN_2S_2$.

*Example 5*

A solution was prepared comprising 14.1 grams (0.2 mole) of 2-cyanoethylamine, 200 ml. of ethyl alcohol and 12.8 grams (0.2 mole) of concentrated ammonium hydroxide. To this stirred solution at 5–15° C. was added dropwise 15.2 grams (0.2 mole) of carbon disulfide and the reaction mixture stirred at 25–30° C. for 1 hour. Thereupon there was added in one portion 36.0 grams (0.2 mole) of 2,3,3-trichloroallyl chloride and the reaction mixture heated at 50–60° C. for 24 hours. After cooling to 25° C., 200 ml. of water and 400 ml. of ethyl ether were added and stirring continued for 15 minutes. The ether layer was separated, washed with water until the washings were neutral to litmus and dried over sodium sulfate. The ether was removed in vacuo at a maximum temperature of 80–90° C./1–2 mm. leaving as the residue, 2,3,3 - trichloroallyl 2 - cyanoethyldithiocarbamate, a low melting solid, obtained in 93.4% yield. Analysis gave 9.69% nitrogen and 22.51% sulfur compared to 9.67% nitrogen and 22.14% sulfur calculated for $C_7H_7Cl_3N_2S_2$.

*Example 6*

Substituting 18.2 grams (0.2 mole) of 2-methallyl chloride for the 2-chloroallyl chloride of Example 1, the reaction mixture was stirred for 24 hours at 25–30° C. There was then added 200 ml. of water and stirring continued at 0–5° C. for two hours. The precipitate was collected by filtration, washed with cold water until the washings were neutral to litmus and air-dried at 25–30° C. 2-methallyl 2-cyanoethyldithiocarbamate was obtained in 99% yield as a white solid melting at 41–42° C. after recrystallization from alcohol. Analysis gave 13.97% nitrogen and 32.19% sulfur compared to 13.99% nitrogen and 32.01% sulfur calculated for $C_8H_{12}N_2S_2$.

*Example 7*

A mixture was prepared comprising 35.05 grams (0.5 mole) of 2-cyanoethylamine, 300 ml. of water and 32 grams (0.5 mole) of concentrated ammonium hydroxide. To the stirred mixture was added dropwise at 5–15° C., 38 grams (0.5 mole) of carbon disulfide and stirring continued at 25–30° C. for one hour. Thereupon there was added in one portion 38.2 grams (0.5 mole) of allyl chloride, causing a temperature rise from 28 to 45° C. The reaction mixture was stirred at 25–30° C. for 24 hours and then cooled to 0° C. The resulting solid was filtered from solution and washed with cold water until neutral to litmus. Upon drying at 25–30° C. the solid became oily. The amber oil was placed in vacuo (1–2 mm.) at 80–90° C. to remove water. Allyl 2-cyanoethyldithiocarbamate was obtained in 63% yield analyzing 14.91% nitrogen and 34.41% sulfur compared to 15.04% nitrogen and 34.42% sulfur calculated for $C_7H_{10}N_2S_2$.

Employing the same reaction conditions and replacing allyl chloride with an equi-molar amount, respectively, of 1,3-dichloropropene and 3,3-dichloroallyl chloride, further examples of the invention were prepared possessing the following physical properties:

*Example 8*

3-chloroallyl 2-cyanoethyldithiocarbamate, a tan solid, M.P. 64–65° C. after recrystallization from dilute ethyl alcohol, in 97% yield. Analysis gave 12.64% nitrogen, 29.69% sulfur, and 16.28% chlorine compared to 12.69% nitrogen, 29.05% sulfur, and 16.06% chlorine calculated for $C_7H_9ClN_2S_2$.

*Example 9*

3,3-dichloroallyl 2-cyanoethyldithiocarbamate, a tan solid, M.P. 75–77° C. after recrystallization from dilute ethyl alcohol, in 65.2% yield. Analysis gave 10.81% nitrogen, 25.09% sulfur, and 28.39% chlorine compared to 10.98% nitrogen, 25.13% sulfur, and 27.79% chlorine calculated for $C_7H_8Cl_2N_2S_2$.

*Example 10*

To a stirred solution containing 140.1 grams (2.0 moles) of 2-cyanoethylamine, 800 ml. of ethyl alcohol and 126 grams (2.0 moles) of concentrated ammonium hydroxide was added, dropwise at 5–15° C., 152 grams (2.0 moles) of carbon disulfide. After stirring at 25–30° C. for one hour, 179.1 grams (2.0 moles) of 2-cyanoethyl chloride was added in one portion. The stirred reaction mixture was heated at 50–60° C. for 24 hours and cooled to 0° C. One liter of cold water was added and the mixture stirred at 0–10° C. for two hours. The solid was collected by filtration and washed with water until the washings were neutral to litmus and air-dried at 25–30° C. 2-cyanoethyl-2-cyanoethyldithiocarbamate, a white solid melting at 93–94° C. was obtained in 34% yield. After recrystallization from ethyl alcohol, it melted at 94–95° C. Analysis gave 21.31% nitrogen and 32.15% sulfur compared to 21.09% nitrogen and 32.18% sulfur calculated for $C_7H_9N_3S_2$.

It is intended to cover all changes and modifications of the examples of the invention herein chosen for purposes of disclosure which do not constitute departures from the spirit and scope of the invention.

What is claimed is:
1. A method of protecting foliage against *Venturia inaequalis* fungus growth which comprises applying thereto in a concentration toxic to *Venturia inaequalis* a compound of the formula

$$NCCH_2CH_2N\overset{H}{-}\overset{\overset{S}{\|}}{C}-S-R$$

where R is selected from a group consisting of lower 2-alkenyl, lower halo-2-alkenyl, and lower cyanoalkyl.

2. The method of protecting foliage from *Venturia inaequalis* fungus growth which comprises applying thereto in a concentration toxic to *Venturia inaequalis* 3-chloroallyl 2-cyanoethyldithiocarbamate.

3. The method of protecting foliage from *Venturia inaequalis* fungus growth which comprises applying thereto in a concentration toxic to *Venturia inaequalis* allyl 2-cyanoethyldithiocarbamate.

4. The method of protecting foliage from *Venturia inaequalis* fungus growth which comprises applying thereto in a concentration toxic to *Venturia inaequalis* 2-chloroallyl 2-cyanoethyldithiocarbamate.

5. The method of protecting foliage from *Venturia inaequalis* fungus growth which comprises applying thereto in a concentration toxic to *Venturia inaequalis* 2-methallyl 2-cyanoethyldithiocarbamate.

6. The method of protecting foliage from *Venturia inaequalis* fungus growth which comprises applying thereto in a concentration toxic to *Venturia inaequalis* 2,3,3-trichloroallyl 2-cyanoethyldithiocarbamate.

7. The method of protecting foliage from *Venturia inaequalis* fungus growth which comprises applying thereto in a concentration toxic to *Venturia inaequalis* 2-cyanoethyl 2-cyanoethyldithiocarbamate.

References Cited by the Examiner

UNITED STATES PATENTS

| | | | |
|---|---|---|---|
| 2,372,895 | 4/1945 | Harmon | 260—793 |
| 2,390,713 | 12/1945 | Hunt | 260—567 |
| 2,520,280 | 8/1950 | Harmon | 260—429 |
| 2,744,898 | 5/1956 | Harmon et al. | 260—247.1 |
| 2,792,327 | 5/1957 | Hunt | 167—22 |
| 2,854,467 | 9/1958 | Harmon et al. | 260—455 |
| 2,859,235 | 11/1958 | Schmidt et al. | 260—454 |
| 2,859,236 | 11/1958 | Schmidt et al. | 260—454 |
| 2,882,291 | 4/1959 | Harmon et al. | 260—455 |
| 2,974,082 | 3/1961 | Collins | 167—22 |
| 2,999,110 | 9/1961 | Lott et al. | 260—553 |
| 3,034,949 | 5/1962 | Ryker | 167—22 |
| 3,051,735 | 8/1962 | D'Amico | 260—429.9 |
| 3,056,822 | 10/1962 | D'Amico | 260—455 |
| 3,070,491 | 12/1962 | Heusch et al. | 167—22 |
| 3,078,273 | 2/1963 | Harmon et al. | 260—293.4 |
| 3,082,237 | 3/1963 | D'Amico | 260—455 |
| 3,096,236 | 7/1963 | D'Amico | 167—22 |

FOREIGN PATENTS

| | | |
|---|---|---|
| 519,232 | 12/1955 | Canada. |
| 954,286 | 12/1949 | France. |
| 1,147,795 | 4/1963 | Germany. |
| 652,614 | 4/1951 | Great Britain. |
| 769,222 | 3/1957 | Great Britain. |

ELBERT L. ROBERTS, *Acting Primary Examiner.*

LEWIS GOTTS, JULIAN S. LEVITT, *Examiners.*

GEORGE A. MENTIS, SHEP K. ROSE,
*Assistant Examiners.*